United States Patent
Adams et al.

(10) Patent No.: US 9,386,104 B2
(45) Date of Patent: Jul. 5, 2016

(54) PREVENTING EXTRACTION OF SECRET INFORMATION OVER A COMPROMISED ENCRYPTED CONNECTION

(71) Applicant: Juniper Networks, Inc., Sunnyvale, CA (US)

(72) Inventors: Kyle Adams, Brisbane, CA (US); Daniel J. Quinlan, San Francisco, CA (US)

(73) Assignee: Juniper Networks Inc., Sunnyvale, CA (US)

( * ) Notice: Subject to any disclaimer, the term of this patent is extended or adjusted under 35 U.S.C. 154(b) by 370 days.

(21) Appl. No.: 14/024,336

(22) Filed: Sep. 11, 2013

(65) Prior Publication Data
US 2015/0058493 A1    Feb. 26, 2015

Related U.S. Application Data

(60) Provisional application No. 61/868,872, filed on Aug. 22, 2013.

(51) Int. Cl.
  G06F 15/16    (2006.01)
  H04L 29/08    (2006.01)
  H04L 29/06    (2006.01)

(52) U.S. Cl.
  CPC .......... *H04L 67/142* (2013.01); *H04L 63/1475* (2013.01)

(58) Field of Classification Search
  CPC .... H04L 67/02; H04L 67/142; H04L 63/1475
  See application file for complete search history.

(56) References Cited

U.S. PATENT DOCUMENTS

| | | | | |
|---|---|---|---|---|
| 7,779,103 B1 * | 8/2010 | Fikes | ................... | G06F 21/6263 709/219 |
| 8,099,602 B2 | 1/2012 | Adams | | |
| 8,549,282 B2 * | 10/2013 | Sabo | ....................... | H04L 63/06 380/229 |
| 8,704,852 B2 | 4/2014 | Adams | | |
| 8,949,988 B2 | 2/2015 | Adams et al. | | |
| 2008/0120570 A1 | 5/2008 | Adams et al. | | |
| 2009/0083538 A1 * | 3/2009 | Merugu | ............... | H04L 63/0281 713/153 |
| 2009/0193129 A1 * | 7/2009 | Agarwal | .............. | H04L 63/0281 709/229 |
| 2010/0077296 A1 | 3/2010 | Adams | | |
| 2010/0169863 A1 | 7/2010 | Adams | | |
| 2011/0081006 A1 * | 4/2011 | Hao | ................... | H04M 3/53333 379/88.13 |
| 2011/0093710 A1 * | 4/2011 | Galvin | ................... | H04L 63/061 713/169 |
| 2011/0219057 A1 * | 9/2011 | Scoda | .................... | H04L 65/105 709/203 |
| 2012/0036178 A1 * | 2/2012 | Gavini | .................. | G06F 9/5027 709/203 |
| 2013/0157568 A1 * | 6/2013 | Jain | ........................ | H04W 24/08 455/41.2 |
| 2013/0227004 A1 * | 8/2013 | Scoda | ..................... | H04L 67/02 709/203 |
| 2013/0246563 A1 * | 9/2013 | Cardozo | ........... | G06F 17/30876 709/217 |
| 2013/0246630 A1 * | 9/2013 | Exton | ..................... | H04L 67/02 709/227 |
| 2014/0280699 A1 * | 9/2014 | Mohapatra | .............. | H04L 67/02 709/217 |

OTHER PUBLICATIONS

Wikipedia, "Transport Layer Security", http:en.wikipedia.org/wiki/Transport_layer_security, Aug. 16, 2013, 15 pages.

* cited by examiner

*Primary Examiner* — Jonathan Bui
(74) *Attorney, Agent, or Firm* — Harrity & Harrity, LLP

(57) ABSTRACT

A device may receive, from a first device, a first message that includes a first random cookie and a session cookie. The device may provide the first message to a second device. The device may receive, from the second device, a second message that includes a response to the first message. The device may generate a second random cookie. The second random cookie may be different from the first random cookie. The device may provide, to the first device, the second random cookie, the session cookie, and the response.

21 Claims, 12 Drawing Sheets

US 9,386,104 B2

PREVENTING EXTRACTION OF SECRET INFORMATION OVER A COMPROMISED ENCRYPTED CONNECTION

RELATED APPLICATION

This application claims priority under 35 U.S.C. §119 to U.S. Provisional Patent Application No. 61/868,872, filed on Aug. 22, 2013, the content of which is incorporated by reference herein in its entirety.

BACKGROUND

A hacker may capture information provided by a user using a secure socket layer connection. The hacker may use the captured information to harm the user, such as by learning the user's credit card information and using the credit card information to make unauthorized purchases, learning the user's banking information, or the like.

SUMMARY

According to some possible implementations, a device may include one or more processors to: receive, from a first device, a first message that includes a first random cookie and a session cookie; provide the first message to a second device; receive, from the second device, a second message that includes a response to the first message; generate a second random cookie, where the second random cookie is different from the first random cookie; and provide, to the first device, the second random cookie, the session cookie, and the response.

According to some possible implementations, a method may include: receiving, by a security device and from a client device, a first request that includes a first random cookie and a session cookie associated with an encrypted communication session; providing, by the security device, the first request to a server device; receiving, by the security device and from the server device, information associated with a response to the first request; generating, by the security device, a second random cookie associated with the encrypted communication session, where the second random cookie is different from the first random cookie; and providing, by the security device and to the client device, the second random cookie, the session cookie, and the information associated with the response to the first request.

According to some possible implementations, a computer-readable medium may store one or more instructions that, when executed by one or more processors, cause the one or more processors to: receive, from a first device, a first message that includes a first random identifier and a session identifier, where the session identifier identifies an encrypted communication session associated with the first message; provide the first message to a second device, where the second device is different from the first device; receive, from the second device, a second message that includes information associated with a response to the first message; generate a second random identifier, where the second random identifier is different from the first random identifier; and provide, to the first device, the second random identifier and the information associated with the response, without providing the first random identifier.

DETAILED DESCRIPTION

The following detailed description of example implementations refers to the accompanying drawings. The same reference numbers in different drawings may identify the same or similar elements.

A hacker may capture private information of a user by causing the user to visit a website that contains malicious code. The malicious code may be designed to cause a client device of the user to send multiple requests over an encrypted connection, such as a secure socket layer (SSL) connection or a transport layer security (TLS) connection. The hacker may manipulate information included in the request (e.g., a uniform resource locator (URL) included in the request, a header of the request, a body of the request, etc.) to ascertain a session cookie associated with the connection. Once the hacker has ascertained the session cookie, the hacker can use the session cookie to obtain private information, such as the user's credit card number, social security number, bank account number, or the like.

A hacker's strategy for ascertaining the session cookie may depend on determining a consistent position of the session cookie within multiple requests (e.g., as in a Browser Exploit Against SSL/TLS (BEAST) attack), or may depend on determining different compression ratios associated with multiple requests (e.g., as in a Compression Ratio Info-leak Made Easy (CRIME) attack). Implementations described herein defend against these hacking strategies by introducing random cookies that are different in each request, thereby randomly altering the length of different requests and/or the compression ratios of different requests.

Figure 1A:
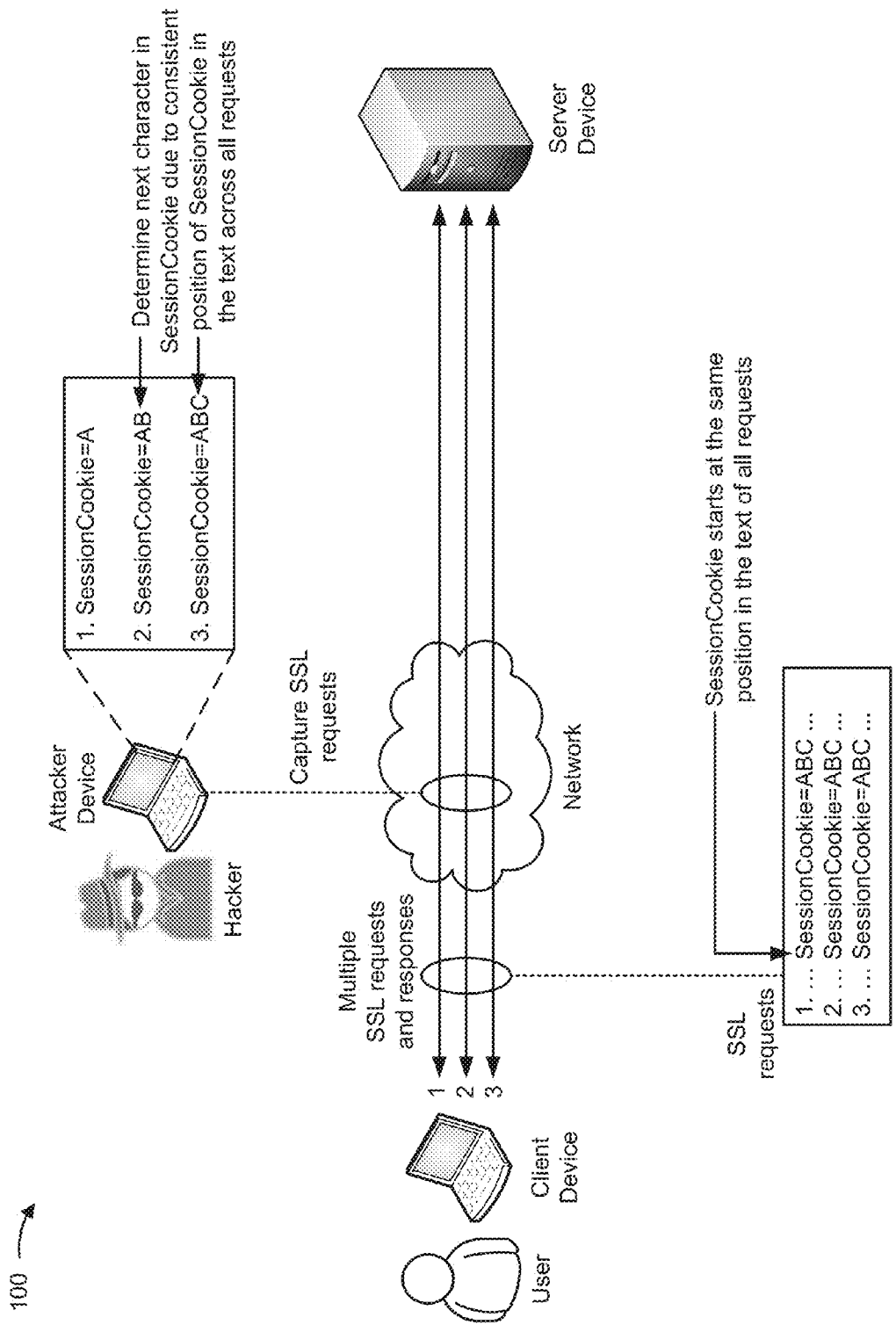
FIGS. 1A and 1B are diagrams of an overview of an example implementation described herein.
Figure 1B:
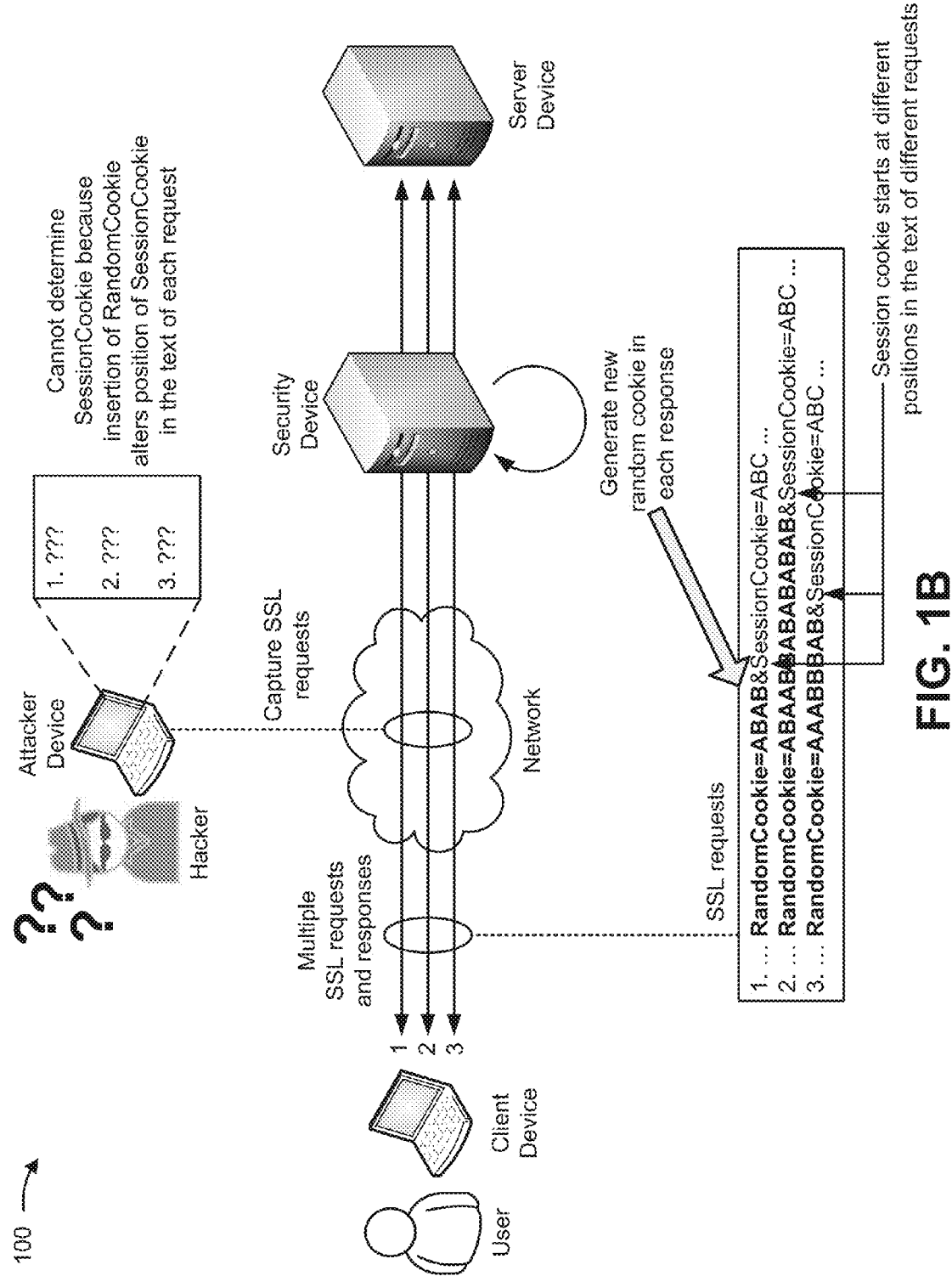

FIGS. 1A and 1B are diagrams of an overview of an example implementation 100 described herein. As shown in FIG. 1A, a client device, associated with a user, may send multiple SSL requests to, and may receive multiple SSL responses from, a server device (e.g., a web server). For example, the client device may send the SSL requests to the server device after visiting a website that includes malicious code that causes the client device to repeatedly send the SSL requests. Each SSL request may include a session cookie at the same position within the text of the multiple requests. As further shown, a hacker using an attacker device may capture each SSL request, and may use various hacking techniques to ascertain the session cookie character-by-character. The success of these hacking techniques may depend on the session cookie being positioned at a same position within the text of each request.

As shown in FIG. 1B, a security device (e.g., a reverse proxy) may be utilized to thwart the hacker's attempt at ascertaining the session cookie. The security device may forward SSL requests (e.g., including the session cookie) from the client device to the server device. The security device may also receive SSL responses (e.g., including the session cookie) from the server device. The security device may generate a random cookie, and may provide the random cookie and the session cookie to the client device. The client device may then use the random cookie in a subsequent SSL request, such as by placing the random cookie before the session cookie in the text of the request. As shown, different random cookies generated for different SSL requests and/or responses may be different lengths. Thus, a hacker using an attacker device cannot ascertain the session cookie because the session cookie is positioned at different positions in different requests (e.g., based on the length of the random cookie).

While FIGS. 1A and 1B are described in connection with an SSL communication (e.g., SSL requests and SSL responses during an SSL session), other encrypted communications may be protected by the security device, such as a TLS communication, or the like.

Figure 2:
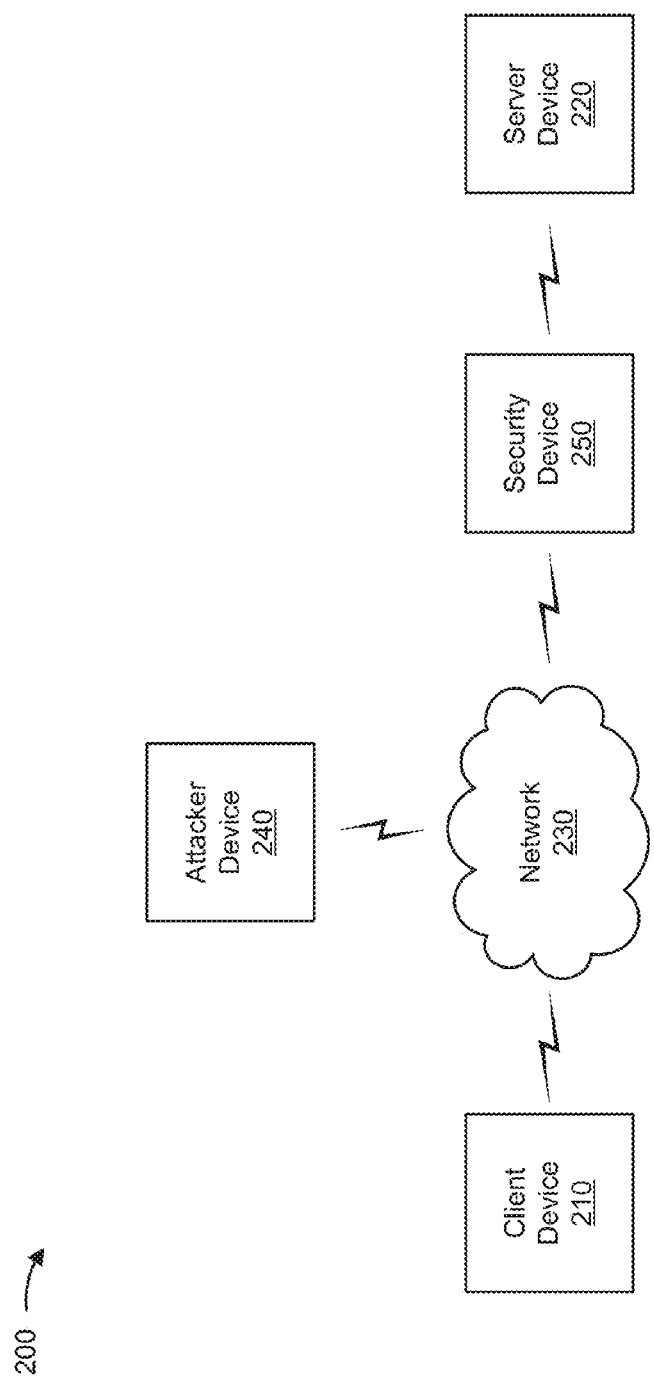
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a server device 220, a network 230, an attacker device 240, and a security device 250. Devices of environment 200 may interconnect via wired connections, wireless connections, or a combination of wired and wireless connections.

Client device 210 may include one or more devices capable of receiving and/or providing information via an encrypted connection (e.g., an SSL connection, a TLS connection, etc.), and/or capable of generating, storing, and/or processing information received and/or provided via an encrypted connection. For example, client device 210 may include a computing device, such as a laptop computer, a tablet computer, a handheld computer, a desktop computer, a mobile phone (e.g., a smart phone, a radiotelephone, etc.), a personal digital assistant, or a similar device. Client device 210 may receive information from and/or provide information to server device 220 (e.g., via network 230 and/or security device 250). Client device 210 may receive and/or provide the information via an encrypted connection.

Server device 220 may include one or more devices capable of receiving and/or providing information via an encrypted connection, and/or capable of generating, storing, and/or processing information received and/or provided via an encrypted connection. For example, server device 220 may include a computing device, such as a server (e.g., an application server, a content server, a host server, a web server, etc.), a desktop computer, a laptop computer, or a similar device. Server device 220 may receive information from and/ or provide information to client device 210 (e.g., via network 230 and/or security device 250). Server device 220 may receive and/or provide the information via an encrypted connection.

Network 230 may include one or more wired and/or wireless networks. For example, network 230 may include a wireless local area network (WLAN), a local area network (LAN), a wide area network (WAN), a metropolitan area network (MAN), a telephone network (e.g., the Public Switched Telephone Network (PSTN)), a cellular network, a public land mobile network (PLMN), an ad hoc network, an intranet, the Internet, a fiber optic-based network, or a combination of these or other types of networks. In some implementations, network 230 may include a wireless network (e.g., a Wi-Fi network, a WiMAX network, a Bluetooth network, etc.) to which both client device 210 and attacker device 240 are connected.

Attacker device 240 may include one or more devices capable of communicating with other devices (e.g., client device 210) via a network (e.g., network 230), and/or capable of receiving information provided by another device (e.g., client device 210). For example, attacker device 240 may include a computing device, such as a laptop computer, a tablet computer, a handheld computer, a desktop computer, a mobile phone (e.g., a smart phone, a radiotelephone, etc.), a personal digital assistant, or a similar device. Attacker device 240 may be capable of capturing traffic (e.g., encrypted traffic, an SSL request, an SSL response, a TLS request, a TLS response, etc.) associated with network 230. For example, attacker device 210 may capture information received by and/or transmitted by client device 210 (e.g., via network 230).

Security device 250 may include one or more devices capable of processing and/or transferring traffic between client device 210 and server device 220. For example, security device 250 may include a network device, such as a reverse proxy, a server (e.g., a proxy server), a traffic transfer device, a firewall, a router, a load balancer, or the like. Security device 250 may transfer encrypted traffic (e.g., traffic transferred over an encrypted connection, such as an SSL connection, a TLS connection, or the like) between client device 210 and server device 220. Security device 250 may insert and/or modify one or more parameters associated with the encrypted traffic, such as a cookie (e.g., a session cookie, a random cookie, etc.), to protect information included in the traffic from being ascertained by a hacker using attacker device 240.

Security device 250 may be used in connection with a single server device 220 or a group of server devices 220 (e.g., a data center). Communications may be routed through security device 250 to reach the one or more server devices 220. For example, security device 250 may be positioned within a network as a gateway to a private network that includes one or more server devices 220. Additionally, or alternatively, communications from client device 210 may be encoded such that the communications are routed to security device 250 before being routed to server device 220.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
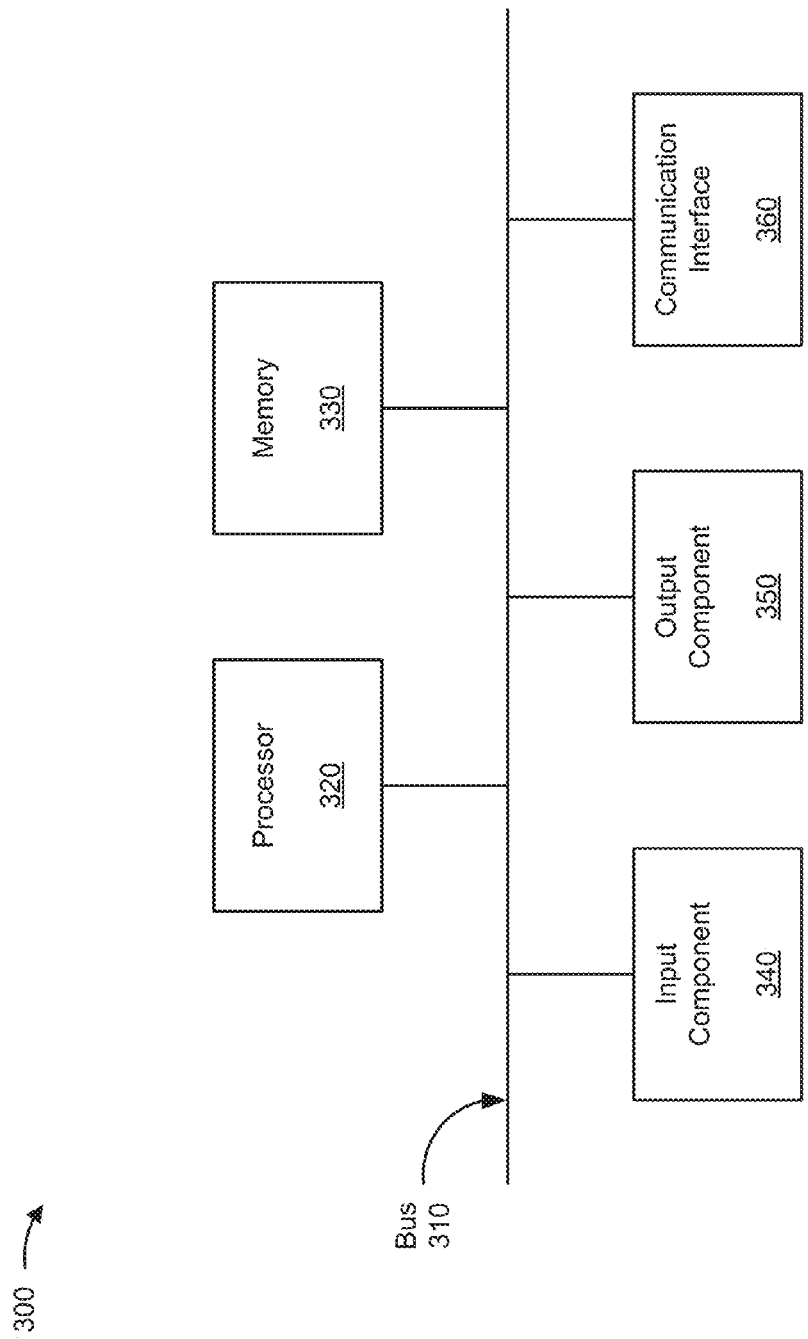
FIG. 3 is a diagram of example components of one or more devices of FIG. 2.

FIG. 3 is a diagram of example components of a device 300, which may correspond to one or more of client device 210, server device 220, attacker device 240, or security device 250. In some implementations, one or more of client device 210, server device 220, attacker device 240, or security device 250 may include one or more devices 300 and/or one or more components of device 300. As shown in FIG. 3, device 300 may include a bus 310, a processor 320, a memory 330, an input component 340, an output component 350, and a communication interface 360.

Bus 310 may include a component that permits communication among the components of device 300. Processor 320 may include a processor (e.g., a central processing unit, a graphics processing unit, an accelerated processing unit), a microprocessor, and/or a processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, or the like.

Device 300 may perform one or more processes described herein. Device 300 may perform these processes in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4A:
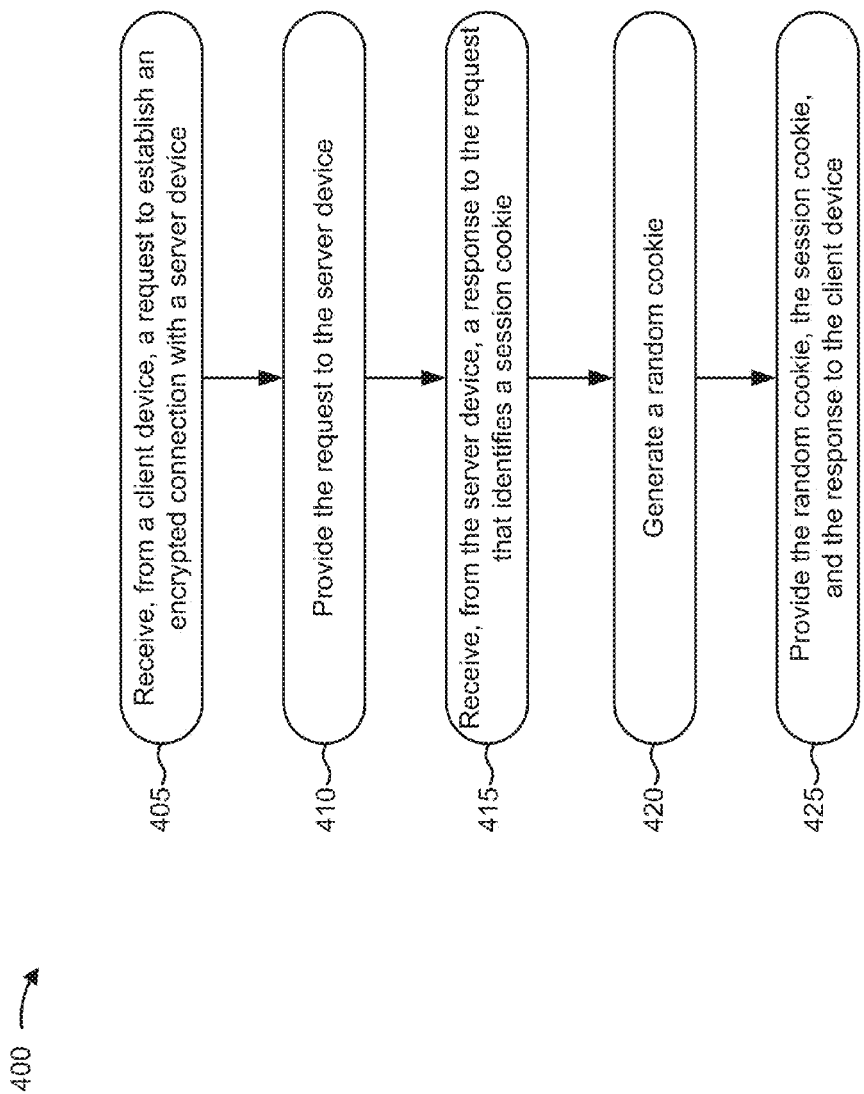
FIGS. 4A and 4B are flow charts of an example process for preventing extraction of private information over an encrypted connection.
Figure 4B:
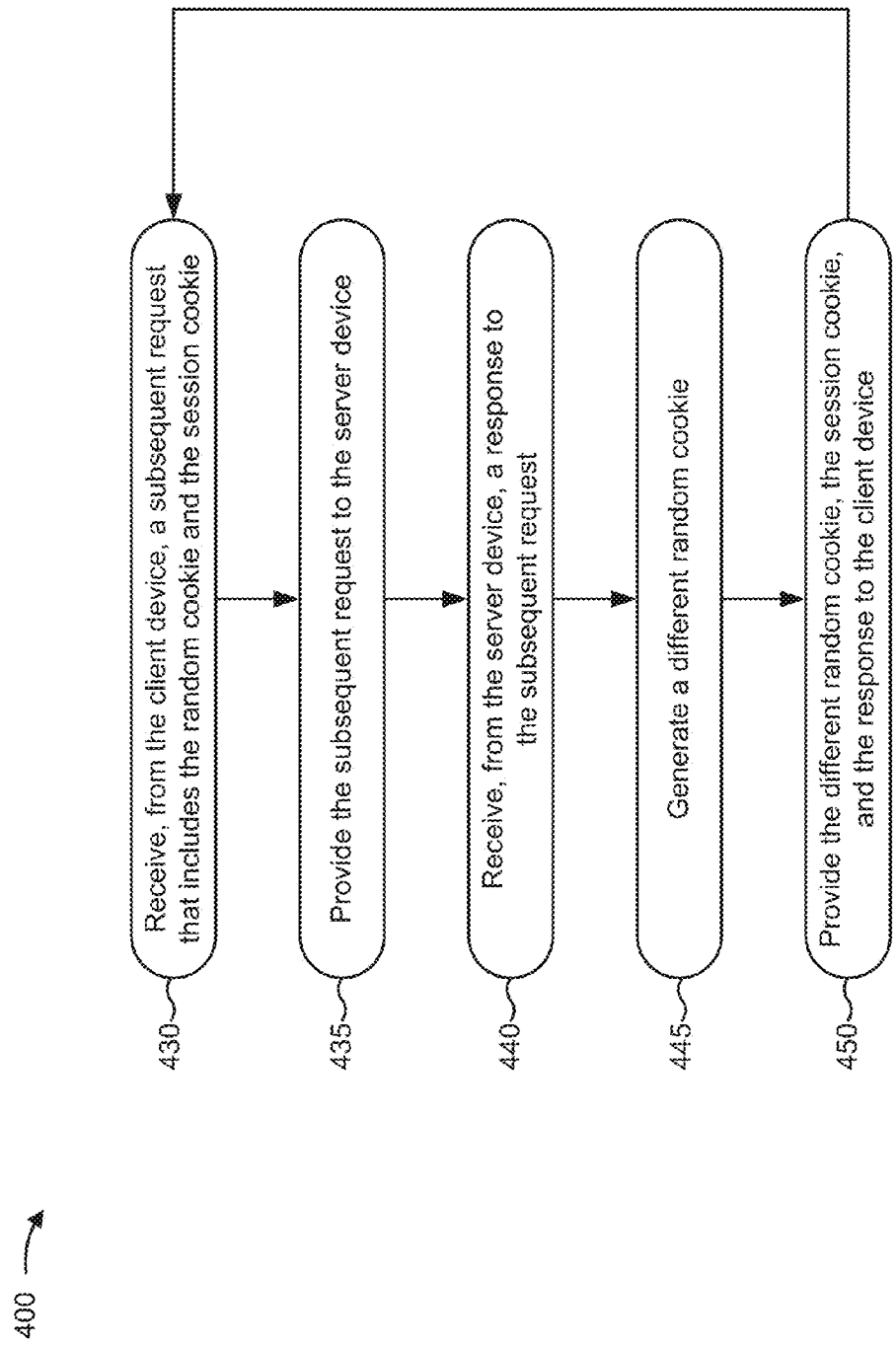

FIGS. 4A and 4B are flow charts of an example process 400 for preventing extraction of private information over an encrypted connection. In some implementations, one or more process blocks of FIGS. 4A and 4B may be performed by security device 250. In some implementations, one or more process blocks of FIGS. 4A and 4B may be performed by another device or a group of devices separate from or including security device 250, such as client device 210 and/or server device 220.

As shown in FIG. 4A, process 400 may include receiving, from a client device, a request to establish an encrypted connection with a server device (block 405). For example, security device 250 may receive, from client device 210, a request to establish an encrypted connection with server device 220. In some implementations, the request may include a request to establish the encrypted connection via a handshake process. An encrypted connection may refer to a communication session that is used to communicate encrypted traffic between devices (e.g., client device 210 and server device 220). For example, an encrypted connection may include an SSL connection (e.g., an SSL session), a TLS connection (e.g., a TLS session), a connection that uses a particular security protocol, cryptographic protocol, and/or encryption protocol, or the like. Additionally, or alternatively, the request may include a Hypertext Transfer Protocol (HTTP) request message, an HTTP Secure (HTTPS) request message, or the like.

In some implementations, the request from client device 210 may be generated as a result of a user of client device 210 navigating to a website that includes malicious code, such as an automated script (e.g., a JavaScript). For example, the website may be associated with a hacker. The malicious code may cause client device 210 to send multiple requests, over an encrypted connection, to a target server (e.g., server device 220). The malicious code may be downloaded and/or executed prior to or after establishing an encrypted connection with the target server. For example, the malicious code may cause client device 210 to send requests to a web server associated with a particular website for which a hacker is trying to ascertain a session cookie (e.g., in order to hijack an encrypted connection between the web server and client device 210). Additionally, or alternatively, the request may be generated as a result of client device 210 receiving user input (e.g., receiving input that causes a browser to navigate to a secure website, receiving a user interaction with a website, etc.).

As further shown in FIG. 4A, process 400 may include providing the request to the server device (block 410), and receiving, from the server device, a response to the request that identifies a session cookie (block 415). For example, security device 250 may provide (e.g., may route, forward, etc.) the request to server device 220. Server device 220 may determine that the request includes a request to establish an encrypted connection, and may generate a session cookie for the encrypted connection (e.g., an authentication cookie, a secure cookie, etc.). The session cookie may include a session identifier (e.g., a string of one or more characters, such as letters, numbers, symbols, etc.) used to identify traffic associated with the session. Server device 220 may provide the session cookie to security device 250 (e.g., in a response to the request). In some implementations, server device 220 may include the session cookie in an HTTP response message, an HTTPS response message, or the like.

The session cookie may include a session cookie label (e.g., SessionCookie), may include a delimiter to separate the session cookie label from a session cookie value (e.g., an equal sign (=)), and/or may include a session cookie value (e.g., a string of characters that identifies the session, such as H4f91). The session cookie label, the delimiter, and the session cookie value may be combined to form the session cookie (e.g., SessionCookie=H4f91).

As further shown in FIG. 4A, process 400 may include generating a random cookie (block 420). For example, security device 250 may generate a random cookie. The random cookie may include a random identifier that is temporarily used (e.g., in a subsequent request by client device 210) to identify and/or protect traffic associated with the session. For example, the random cookie may include a random string of one or more characters. Security device 250 may randomly generate one or more characters to be included in the random cookie, may randomly generate a length of the random cookie, may randomly generate one or more quantities of repeating characters (e.g., substrings included in the session cookie) to be included in the random cookie, or the like.

In some implementations, security device 250 may generate a random cookie with a length that satisfies a threshold length (e.g., that is greater than the threshold length, that is less than the threshold length, that is equal to the threshold length, that is not equal to the threshold length, etc.). The threshold length may be input (e.g., by an operator), and/or may be equal to an encryption block size (e.g., a quantity of bits operated on by an encryption cipher associated with a particular encryption technique).

Security device 250 may generate the random cookie based on the session cookie, in some implementations. For example, security device 250 may determine one or more substrings included in the session cookie. A substring may include, for example, a session cookie label of the session cookie (e.g., SessionCookie), a portion of the session cookie label (e.g., ssionCoo), a delimiter included in the session cookie (e.g., an equal sign (=)), a portion of a delimiter, a session cookie value of the session cookie (e.g., H4f91), a portion of the session cookie value (e.g., H4J), and/or a combination of two or more of the above (e.g., ookie=H4). Additionally, or alternatively, security device 250 may use the entire string of the session cookie rather than a substring (e.g., may use a portion of the session cookie, or may use the entire session cookie).

Security device 250 may use a string and/or a substring included in the session cookie as the random cookie, in some implementations (e.g., RandomCookie=ookie=H4). Additionally, or alternatively, security device 250 may generate the random cookie by repeating one or more substrings, of the session cookie, in the random cookie (e.g., RandomCookie=H4H4H4). In some implementations, security device 250 may generate the random cookie using one or more substrings of the session cookie and one or more random characters (e.g., RandomCookie=H4H4H4AAAAAAAAA). Additionally, or alternatively, security device 250 may generate the random cookie by altering one or more substrings of the session cookie (e.g., RandomCookie=SessionCookie=H4ffffffffffffff999).

Security device 250 may randomly determine a substring to be included and/or repeated in the random cookie (e.g., a starting position of a first character of the substring within the session cookie), may randomly determine a length of one or more substrings to be included and/or repeated in the random cookie (e.g., a substring that includes one character, two characters, three characters, etc.), may determine a random quantity of substrings to be included and/or repeated in the random cookie (e.g., may determine that one substring is to be repeated, may determine that two substrings are to be repeated, etc.), may determine a random quantity of times that one or more substrings are to be repeated in the random cookie (e.g., may determine that a first substring is to be repeated eight times, that a second substring is to be repeated three times, etc.), may determine a random order in which each substring is to be combined to form the random cookie, or the like.

In some implementations, security device 250 may generate the random cookie after receiving the session cookie. In some implementations, security device 250 may generate the random cookie before receiving the session cookie (e.g., after receiving the request, but before receiving the response). In this case, the random cookie may include a random string of characters that is not based on the session cookie, or that is based on a previously-received session cookie.

As further shown in FIG. 4A, process 400 may include providing the random cookie, the session cookie, and the response to the client device (block 425). For example, security device 250 may provide the random cookie (e.g., generated by security device 250), the session cookie (e.g., provided in the response from server device 220), and the response (e.g., from server device 220) to client device 210 (e.g., via network 230). In some implementations, security device 250 may instruct and/or cause client device 210 to store the random cookie and the session cookie (e.g., using a set cookie function). Additionally, or alternatively, security device 250 may instruct client device 210 to use the random cookie and the session cookie in a subsequent communication with server device 220 (e.g., during the encrypted session).

In some implementations, security device 250 may instruct client device 210 to set the random cookie before setting the session cookie. For example, security device 250 may provide an instruction to set a random cookie (e.g., in a Set-Cookie header), such as Set-Cookie: RandomCookie=H4H4H4, before providing an instruction to set a session cookie, such as Set-Cookie: SessionCookie=H4f91 (e.g., the Set-Cookie header for the random cookie may precede and/or may immediately precede the Set-Cookie header for the session cookie). In some implementations, security device 250 may instruct client device 210 to set the random cookie after setting the session cookie. Additionally, or alternatively, security device 250 may instruct client device 210 to reset all cookies associated with the communication session, and may instruct client device 210 to reset the random cookie first (e.g., before resetting other cookies). Based on receiving the instructions, client device 210 may store the random cookie and the session cookie (e.g., in memory), and/or may use the random cookie and the session cookie in a subsequent communication with server device 220. For example, a subsequent communication between client device 210 and server device 220 may include the string:

RandomCookie=H4H4H4; SessionCookie=H4f91.

As shown in FIG. 4B, process 400 may include receiving, from the client device, a subsequent request that includes the random cookie and the session cookie (block 430). For example, security device 250 may receive the subsequent request from client device 210. The subsequent request may include information to be provided to server device 220 via the encrypted connection. For example, the subsequent request may include private information, such as credit card information, banking information, or the like. Additionally, or alternatively, the subsequent request may include an HTTP request message, an HTTPS request message, or the like.

The subsequent request may include the random cookie and the session cookie, in some implementations. For example, client device 210 may receive information identifying the random cookie and the session cookie from security device 250, and may store the information, as described herein in connection with FIG. 4A. Client device 210 may use the stored information to formulate the subsequent request, and may include the random cookie and the session cookie in the subsequent request. The random cookie may precede the session cookie in the subsequent request, so as to change the position of the session cookie within the text of different requests (e.g., when the random cookie changes to a different random value of different length). For example, client device 210 may include the following text in the subsequent request:

Cookie: RandomCookie=H4H4H4; SessionCookie=H4f91.

In the above text, client device 210 has prepended the random cookie to the session cookie using a semicolon (;) delimiter. In some implementations, client device 210 may use another delimiter (e.g., an ampersand, a colon, etc.) to separate the random cookie and the session cookie.

As further shown in FIG. 4B, process 400 may include providing the subsequent request to the server device (block 435), and receiving, from the server device, a response to the subsequent request (block 440). For example, security device 250 may provide (e.g., may route, forward, etc.) the subsequent request to server device 220. Security device 250 may provide the subsequent request to server device 220 with or without the random cookie. For example, security device 250 may forward the subsequent request, including both the random cookie and the session cookie, to server device 220, such as:

Cookie: RandomCookie=H4H4H4; SessionCookie=H4f91.

As another example, security device 250 may remove the random cookie from the subsequent request, and may provide a request message, that does not include the random cookie, to server device 220 (e.g., Cookie: SessionCookie=H4f91).

Server device 220 may determine a subsequent response to the subsequent request (e.g., an appropriate response based on the subsequent request), and may provide the subsequent response to security device 250. The subsequent response may include, for example, a purchase confirmation, a bank account balance, or the like. In some implementations, the subsequent response may include an HTTP response, an HTTPS response, or the like. Additionally, or alternatively, the subsequent response may include the session cookie (e.g., the same session cookie previously generated by server device 220 to establish the encrypted connection, as described herein in connection with FIG. 4A).

As further shown in FIG. 4B, process 400 may include generating a different random cookie (bock 445). For example, security device 250 may generate a different random cookie that is different from a previously-generated random cookie. Security device 250 may generate the different random cookie based on receiving the subsequent request from client device 210 and/or based on receiving the subsequent response from server device 220. For example, security device 250 may generate the different random cookie after receiving the subsequent request from client device 210 but before providing the subsequent request to server device 220, may generate the different random cookie after providing the subsequent request to server device 220 but before receiving the subsequent response from server device 220, may generate the different random cookie after receiving the subsequent response from server device 220, etc.

The different random cookie may be different from a previously-generated random cookie. A previously-generated random cookie may refer to one or more random cookies previously generated by security device 250, and/or included in a request provided by client device 210, for this particular communication session between client device 210 and server device 220. In some implementations, the different random cookie may be different from an immediately preceding random cookie (e.g., a random cookie included in a most recent request received by security device 250), may be different than a threshold quantity of preceding random cookies (e.g., random cookies included in a particular quantity of most recent requests received by security device 250), etc.

As described herein in connection with FIG. 4A, security device 250 may generate a random string of one or more characters to be included in the different random cookie, may generate a random length for the different random cookie (e.g., a random length of the random string), etc. As further described herein in connection with FIG. 4A, security device 250 may generate the different random cookie based on the session cookie. For example, security device 250 may randomly select one or more strings or substrings (e.g., of random lengths and/or starting positions) of the session cookie to be included in the different random cookie, may generate one or more random quantities with which each respective selected string or substring is repeated within the different random cookie, etc.

In some implementations, security device 250 may determine a length of a previously-generated random cookie (e.g., a quantity of characters included in the previously-generated random cookie), and may generate a different random cookie of a different length. In some implementations, a length of the different random cookie may be different than a length of an immediately preceding random cookie, may be different than each length of a threshold quantity of preceding random cookies, etc.

Additionally, or alternatively, security device 250 may determine a compression ratio of a previously-generated random cookie and/or a session cookie (e.g., an amount of memory space required to store text that includes the previously-generated random cookie and the session cookie after the text is compressed using a particular compression technique), and may generate a different random cookie that results in a different compression ratio (e.g., a different amount of memory space required to store text that includes the different random cookie and the session cookie after the text is compressed using the particular compression technique). In some implementations, a size and/or compression ratio of the different random cookie may be different than a size and/or compression ratio of an immediately preceding random cookie, may be different than each size and/or compression ratio of a threshold quantity of preceding random cookies, etc.

In some implementations, security device 250 may determine a compression technique being used (e.g., by client device 210 and/or server device 220) to compress the text that includes the random cookie and the session cookie (e.g., the request and/or the response), and may use the compression technique to determine whether the previously-generated random cookie and the different random cookie result in a different compression ratio (e.g., may compare a compression ratio of the different texts after compression using the compression technique, may compare an amount of memory space occupied by (e.g., a size of) the different texts after compression using the compression technique, etc.).

As further shown in FIG. 4B, process 400 may include providing the different random cookie, the session cookie, and the response to the client device (block 450). For example, security device 250 may provide the different random cookie, the session cookie, and the subsequent response from server device 220 (e.g., which may include the session cookie) to client device 210 (e.g., via network 230). Security device 250 may instruct and/or cause client device 210 to store the different random cookie and the session cookie (e.g., using a set cookie function). Additionally, or alternatively, security device 250 may instruct and/or cause client device 210 to use the different random cookie and the session cookie in a subsequent communication with server device 220 (e.g., during the encrypted session). In some implementations, security device 250 may instruct and/or cause client device 210 to overwrite (e.g., in memory) a previously-generated random cookie with the different random cookie. In some implementations, security device 250 may wait a random amount of time (e.g., a quantity of milliseconds corresponding to a delay time) before providing the different random cookie, the session cookie, and the subsequent response to client device 210, before decrypting a message (e.g., a request, a response, etc.), and/or before performing one or more operations included in process 400.

Security device 250 may instruct client device 210 to set the different random cookie before setting the session cookie, as described herein in connection with FIG. 4A. Based on receiving the instructions, client device 210 may store the different random cookie and the session cookie (e.g., in memory), and/or may use the different random cookie and the session cookie in a subsequent communication with server device 220.

As further shown in FIG. 4B, process 400 may include returning to block 430. For example, security device 250 may receive an additional subsequent request from client device 210, may provide the additional subsequent request to server device 220, may receive an additional response to the additional subsequent request, may generate an additional different random cookie for the additional subsequent request and/or response, and may provide the additional different random cookie to client device 210 (e.g., along with the session cookie and/or the additional response). Security device 250 may perform this process (e.g., blocks 430-450) for a series of requests (e.g., each request associated with the session, every other request associated with the session, etc.) that security device 250 receives from client device 210. In some implementations, security device 250 may generate a random cookie for each request and/or response.

In some implementations, security device 250 may determine an interval for generating random cookies, and may generate a random cookie at each interval. The interval may include a quantity of requests and/or responses. For example, security device 250 may generate a random cookie for every request and/or response, for every other request and/or response, for every third request and/or response, etc. The interval may be set (e.g., input by an operator), and/or may be randomly generated by security device 250 (e.g., for each session, for each request and/or response, etc.).

In some implementations, the interval may include an amount of time that has passed since a random cookie was generated by security device 250. For example, security device 250 may determine an amount of time that has passed since generating a random cookie for an encrypted session, may compare the amount of time to a threshold, and may generate a different random cookie if the amount of time satisfies the threshold. In some implementations, security device 250 may randomly determine whether to generate a random cookie when a request and/or a response is received.

In some implementations, security device 250 may begin generating random cookies based on determining that a particular quantity of requests have been received (e.g., a threshold quantity of requests received from client device 210, a threshold quantity of requests received in a particular period of time, etc.). Such a scenario may indicate that an automated script is generating the requests.

In some implementations, security device 250 may begin generating random cookies based on determining that a length of information included in multiple requests (e.g., a length of a URL, a length of information included in a header of the request, a length of information in a body of the request, etc.) is being incremented (e.g., by one character, by two characters, etc.) with each successive request. Additionally, or alternatively, security device 250 may begin generating random cookies based on determining that a string in the request (e.g., a string in the header of the request, a string in the body of the request, etc.) matches a portion of the session cookie (e.g., a threshold quantity of consecutive matching characters). Such scenarios may indicate that a hacker is manipulating the requests to attempt to ascertain the session cookie.

Additionally, or alternatively, security device 250 may terminate an encrypted communication session and/or may cause a new encrypted communication session to be established based on detecting one or more of the above scenarios. For example, security device 250 may request, from server device 220, a different session cookie value for the encrypted communication session (or a new encrypted communication session), and may provide the different session cookie value to client device 210.

In this way, security device 250 may prevent a hacker from determining private information by ascertaining a session cookie using a hacking technique that depends on determining a position of the session cookie within a message, or determining a compression ratio of the message. Security device 250 may thwart the hacker by randomly altering the position of the session cookie within the message and/or by randomly altering a compression ratio of the message.

Although FIGS. 4A and 4B show example blocks of process 400, in some implementations, process 400 may include additional blocks, fewer blocks, different blocks, or differently arranged blocks than those shown in FIGS. 4A and 4B. Additionally, or alternatively, two or more of the blocks of process 400 may be performed in parallel.

Figure 5A:
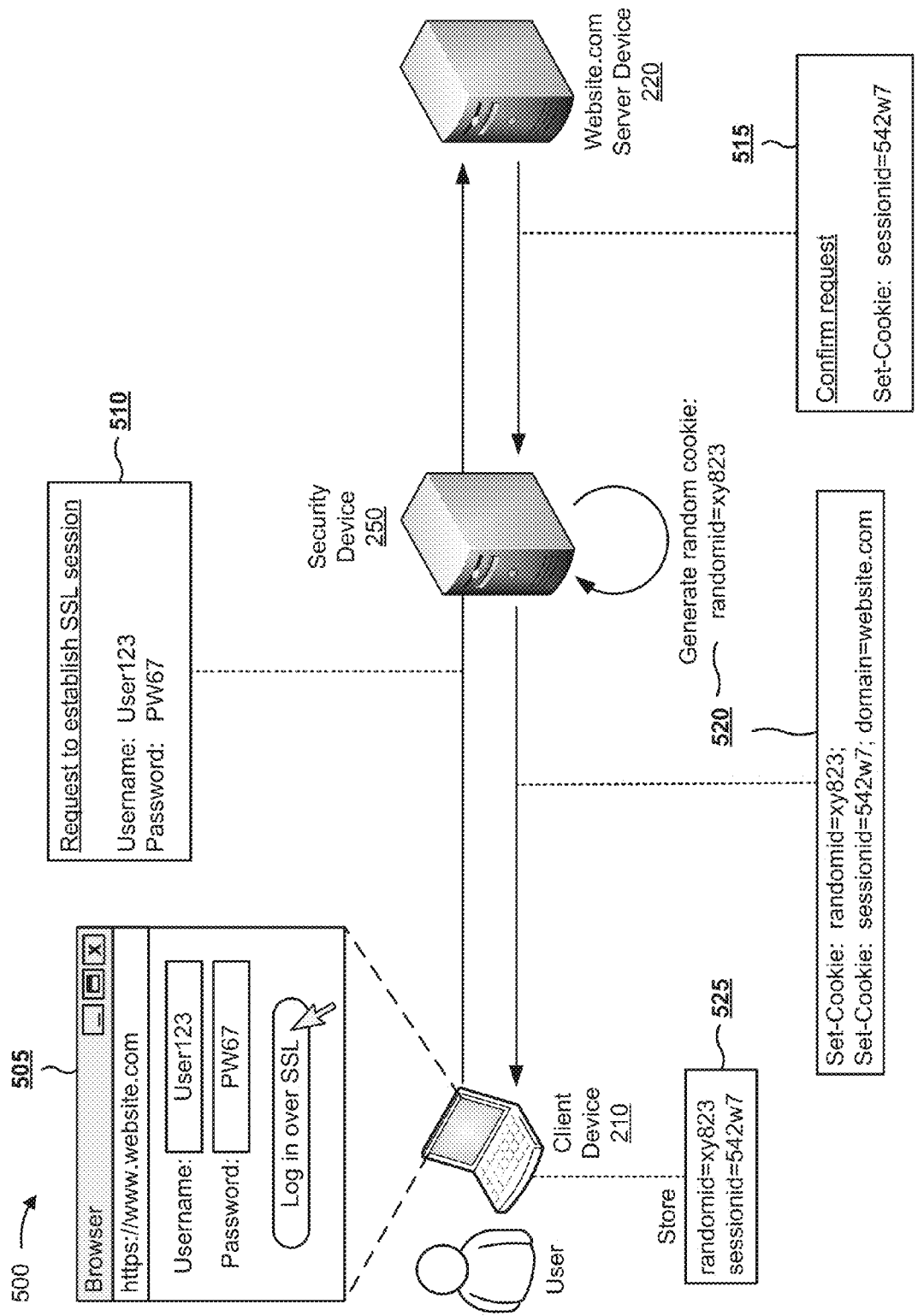
FIGS. 5A-5C are diagrams of an example implementation relating to the example process shown in FIGS. 4A and 4B.
Figure 5B:
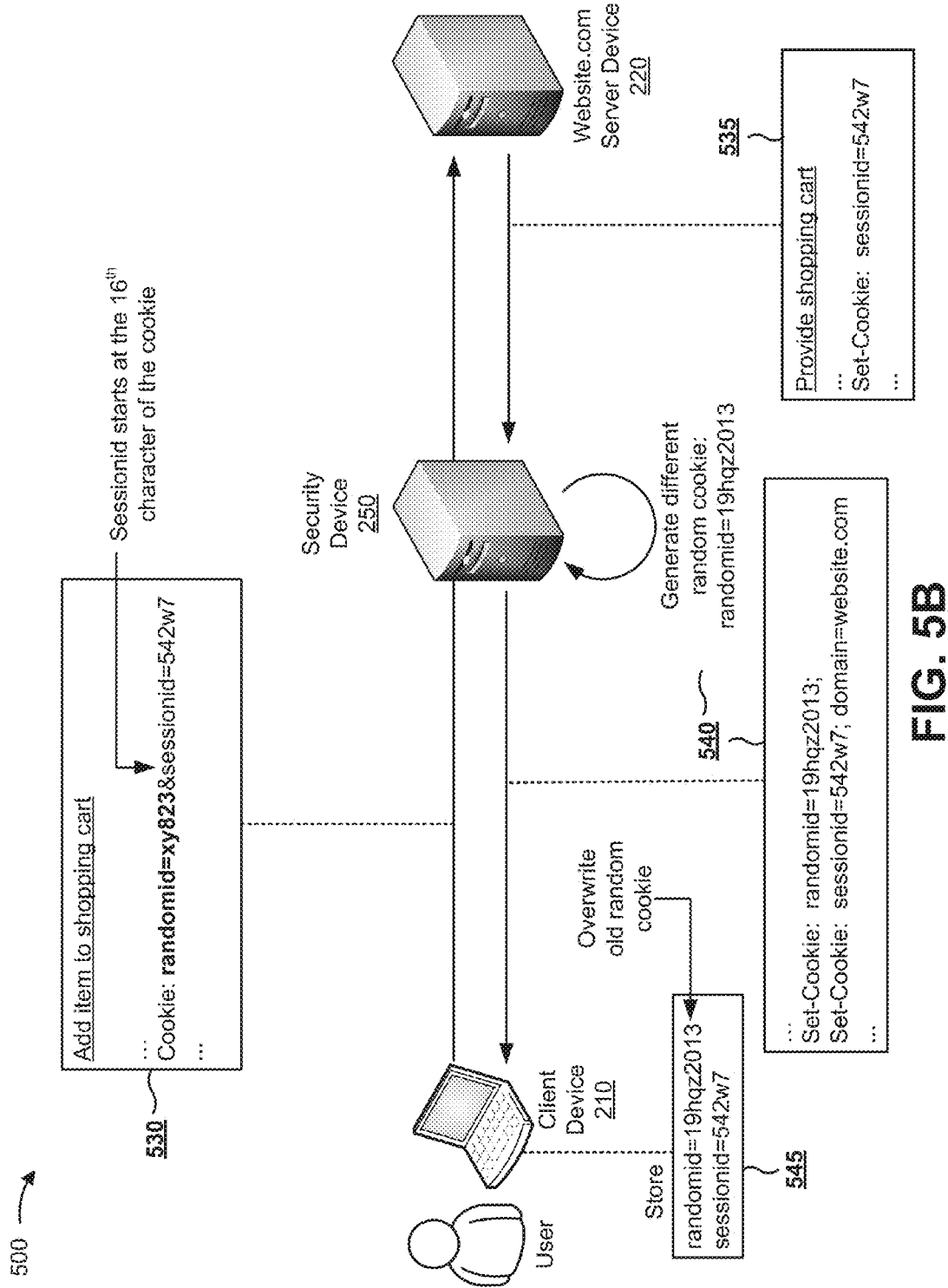
Figure 5C:
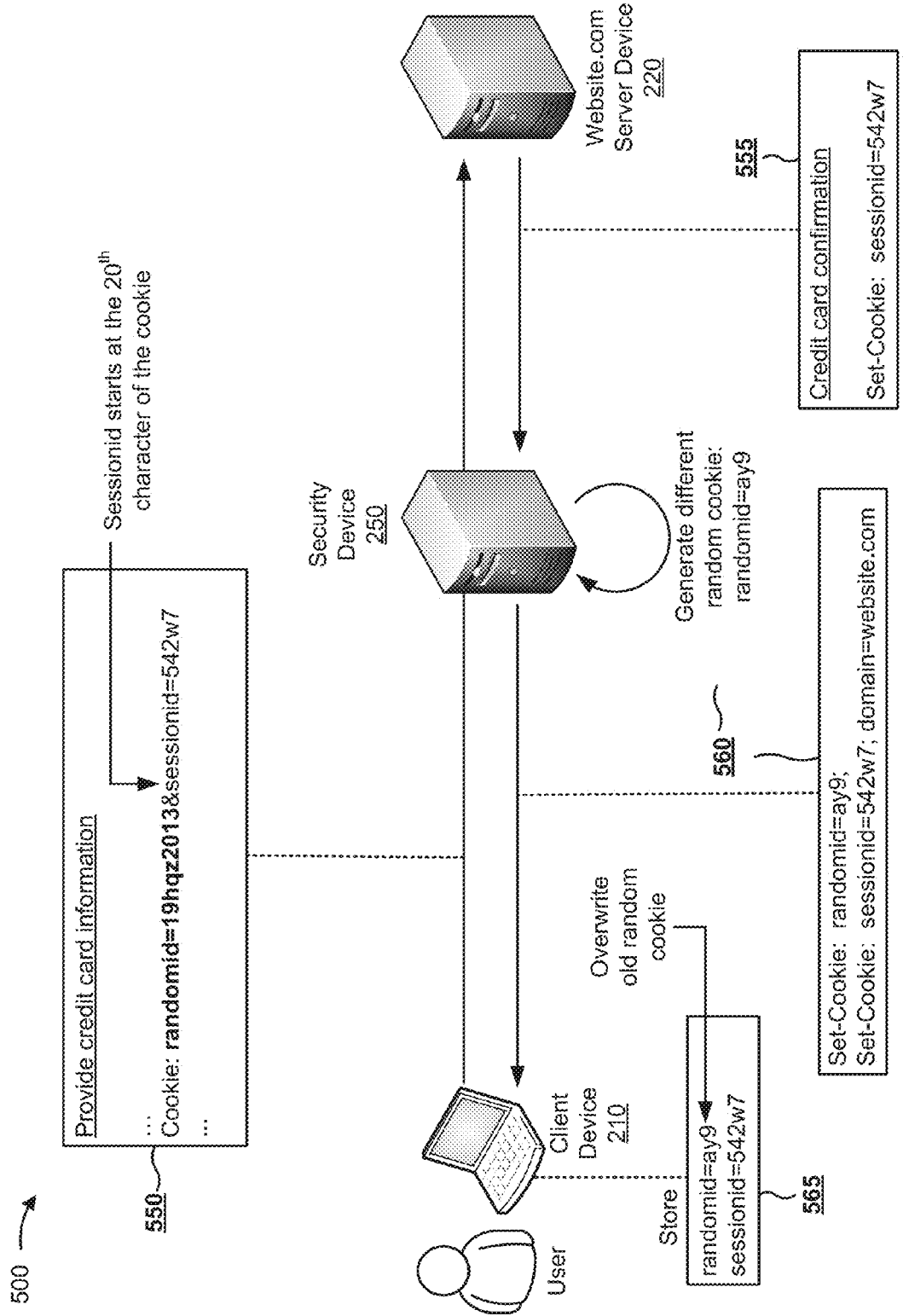

FIGS. 5A-5C are diagrams of an example implementation 500 relating to example process 400 shown in FIGS. 4A and 4B. FIGS. 5A-5C show an example of randomly changing a starting position of a session cookie within the text of a message.

As shown in FIG. 5A, and by reference number 505, assume that a user of client device 210 interacts with a web browser to cause client device 210 to transmit a request to establish an SSL session with server device 220. For example, the user may navigate to a secure website (e.g., https://www.website.com), may provide authentication credentials (e.g., a user name and password), or the like. As shown by reference number 510, security device 250, acting as a reverse proxy, receives the request and forwards the request to server device 220. In some implementations, security device 250 may store information that identifies the requested session, such as information that identifies client device 210 (e.g., a network address), server device 220 (e.g., a network address), etc.

As shown by reference number 515, server device 220 receives the request, and generates a session cookie for the SSL session. Assume that server device 220 generates the session cookie sessionid=542w7, as shown, and provides the session cookie to security device 250 for forwarding to client device 210. As shown by reference number 520, assume that security device 250 generates a random cookie, randomid=xy823, and provides the random cookie and the session cookie to client device 210, along with other information included in a message (e.g., domain=website.com). As shown, security device 250 formulates the message so as to instruct client device 210 to set the random cookie (e.g., Set-Cookie: randomid=xy823) before instructing client device 210 to set the session cookie (e.g., Set-Cookie: sessionid=542w7). As shown by reference number 525, client device 210 receives the message and stores the random cookie and the session cookie in memory.

As shown in FIG. 5B, and by reference number 530, assume that a user interacts with client device 210 to cause client device 210 to send a subsequent request, such as a request to add an item to a shopping cart. As shown, the subsequent request includes the text:

Cookie: randomid=xy823&sessionid=542w7.

In this text, client device 210 has prepended the random cookie to the session cookie, and has separated the random cookie from the session cookie using an ampersand delimiter. In this text, the session cookie starts at the 16th character. Assume that security device 250 receives the request to add the item to the shopping cart, removes the random cookie from the request, and forwards the request to server device 220.

As shown by reference number 535, server device 220 receives the request and generates a response to the request, such as by providing information regarding the shopping cart for display in a web browser of client device 210. Assume that the response includes the session cookie for the SSL session (e.g., sessionid=542w7). Server device 220 provides the response, including the session cookie, to security device 250. As shown by reference number 540, assume that security device 250 generates a different random cookie, randomid=19hqz2013, which is a different length than the previously-generated random cookie, randomid=xy823. Security device 250 provides, to client device 210, the different random cookie, the session cookie, and the response with instructions for displaying the information regarding the shopping cart. As shown by reference number 545, client device 210 receives the message and overwrites the previously-generated random cookie (e.g., randomid=xy823) with the different random cookie (e.g., randomid=19hqz2013).

As shown in FIG. 5C, and by reference number 550, assume that a user interacts with client device 210 to cause client device 210 to send an additional subsequent request, such as by providing credit card information for purchasing the item in the shopping cart. As shown, the additional subsequent request includes the text:

Cookie: randomid=19hqz2013 &sessionid=542w7.

In this text, the session cookie has changed position in the text (e.g., from the previous request), and starts at the 20th character. Assume that security device 250 receives the request, and forwards the request to server device 220.

As shown by reference number 555, server device 220 receives the request and generates a response to the request, such as by providing a confirmation of a purchase with a credit card. Assume that the response includes the session cookie for the SSL session (e.g., sessionid=542w7). Server device 220 provides the response, including the session cookie, to security device 250. As shown by reference number 560, assume that security device 250 generates a different random cookie, randomid=ay9, which is a different length than the previously-generated random cookie, randomid=19hqz2013. Security device 250 provides, to client device 210, the different random cookie, the session cookie, and the response with the purchase confirmation. As shown by reference number 565, client device 210 receives the message and overwrites the previously-generated random cookie (e.g., randomid=19hqz2013) with the different random cookie (e.g., randomid=ay9). Security device 250 may continue to generate random cookies in this manner for requests and/or responses associated with the SSL session. In this way, a hacker may be unable to ascertain the session cookie for the SSL session by manipulating multiple SSL requests to determine the position of the session cookie.

As indicated above, FIGS. 5A-5C are provided merely as an example. Other examples are possible and may differ from what was described with regard to FIGS. 5A-5C. For example, implementation 500 is described with respect to a user causing client device 210 to send legitimate requests (e.g., requests to add an item to a shopping cart, requests to purchase an item, etc.). In other situations, an automated script may cause client device 210 to repeatedly send the requests.

Figure 6A:
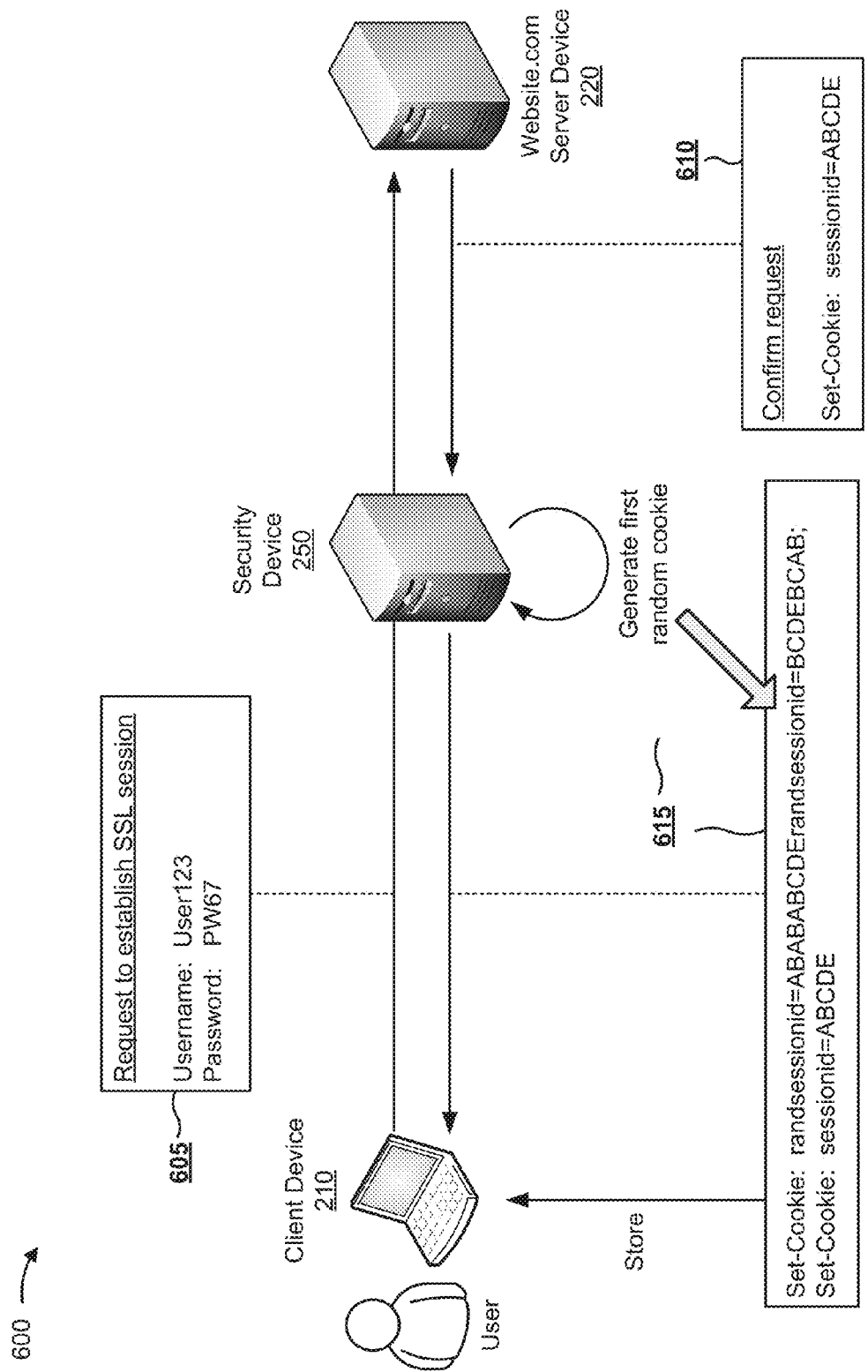
FIGS. 6A-6C are diagrams of another example implementation relating to the example process shown in FIGS. 4A and 4B.
Figure 6B:
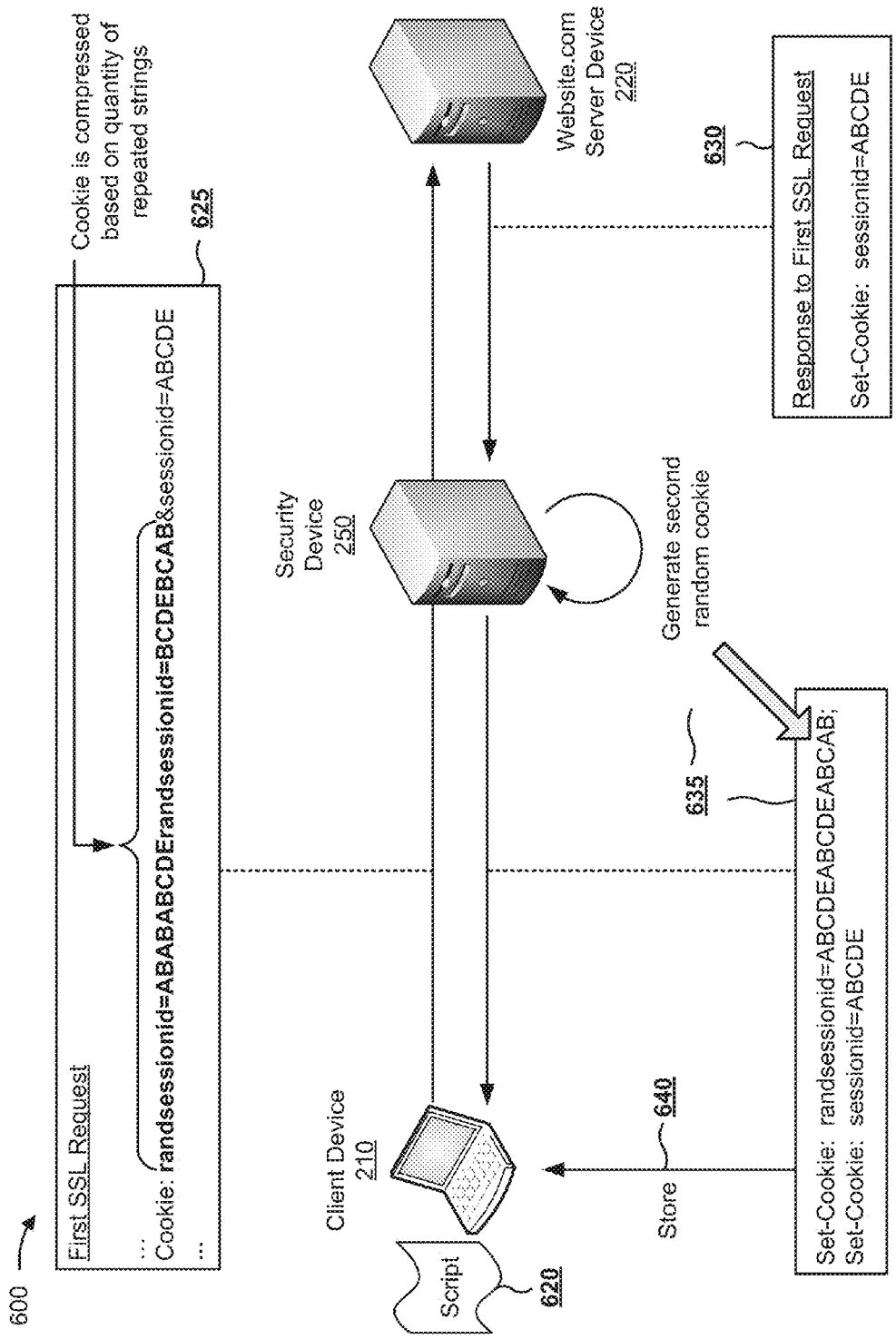
Figure 6C:
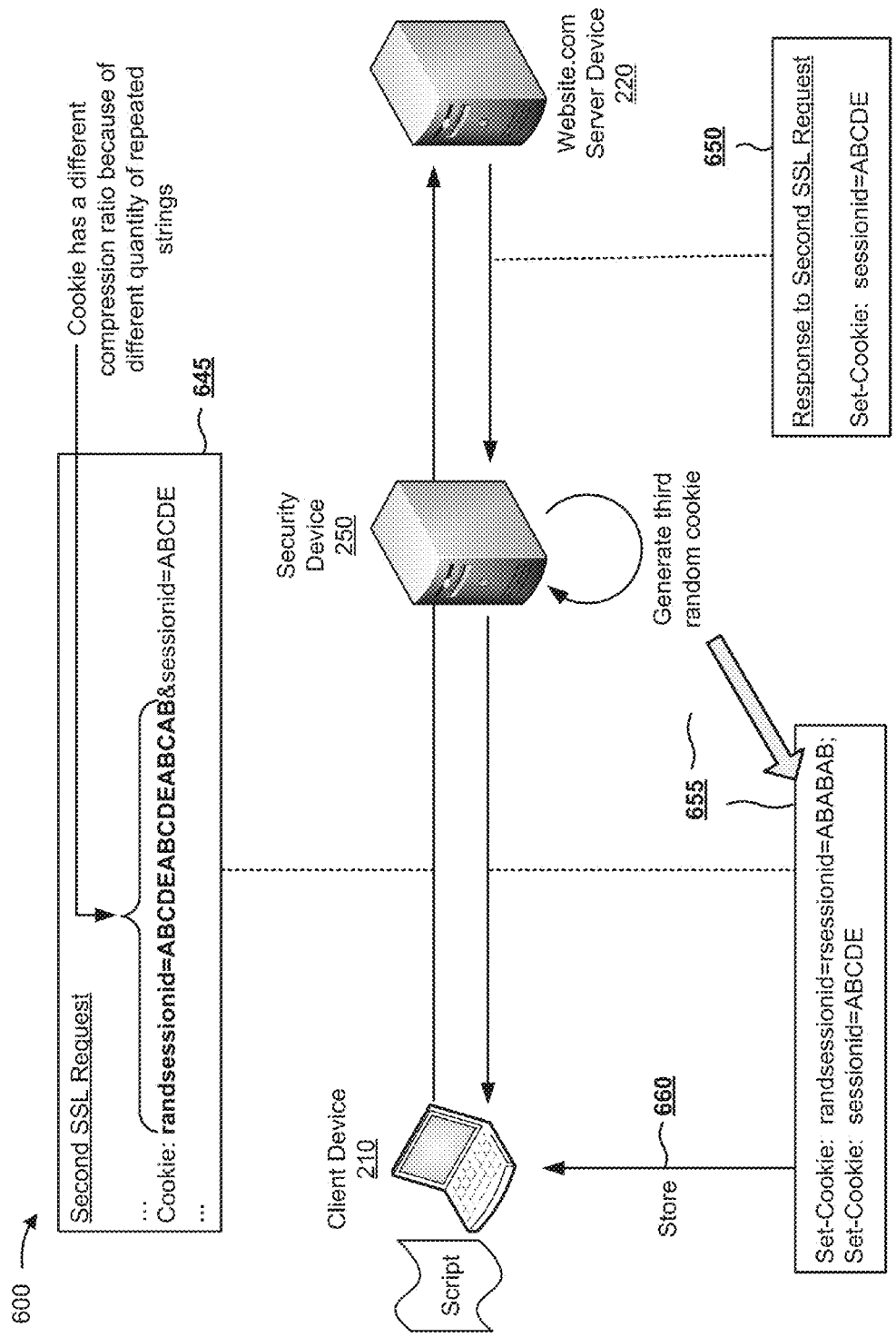

FIGS. 6A-6C are diagrams of another example implementation 600 relating to example process 400 shown in FIGS. 4A and 4B. FIGS. 6A-6C show an example of randomly changing a compression ratio of an encrypted request.

As shown in FIG. 6A, and by reference number 605, assume that a user of client device 210 causes client device 210 to transmit a request to establish an SSL session with server device 220, such as by navigating to a secure website and/or providing authentication credentials. Assume that security device 250 receives the request and forwards the request to server device 220. As shown by reference number 610, server device 220 receives the request and generates a session cookie for the SSL session. Assume that server device 220 generates the session cookie sessionid=ABCDE, as shown, and provides the session cookie to security device 250 for forwarding to client device 210. As shown by reference number 615, assume that security device 250 generates a first random cookie using repeated substrings of the session cookie. For example, assume that security device 250 generates the first random cookie:

randsessionid=ABABABCDErandsessionid=BCDEBCAB.

This first random cookie repeats the session cookie label (e.g., the string sessionid is included twice in the first random cookie), repeats the delimiter (e.g., the equal sign is included twice in the first random cookie), and includes various substrings of the session cookie value (e.g., AB, CDE, ABCDE, BCDE, BC, etc.), some of which are repeated in the first random cookie (e.g., the substring AB is repeated multiple times).

Assume that security device 250 provides the first random cookie, the session cookie, and the response from server device 220 to client device 210, which causes client device 210 to store the first random cookie and the session cookie, and to use the first random cookie and the session cookie in a subsequent request. Further, assume that the user continues to interact with client device 210 during the SSL session, such as by providing private information (e.g., credit card information, banking information, a username and password, etc.).

As shown in FIG. 6B, and by reference number 620, assume that an automated script is executing on client device 210. For example, assume that the user had previously navigated to a website associated with a hacker, which caused the automated script to be downloaded and/or executed on client device 210. As shown by reference number 625, assume that the automated script causes client device 210 to send a first SSL request to server device 220. As shown, the first SSL request includes the text:

Cookie: randsessionid=ABABABCDErandsessionid=
BCDEBCAB&sessionid=ABCDE.

In this text, client device 210 has prepended the first random cookie to the session cookie, and has separated the first random cookie from the session cookie using an ampersand delimiter. Assume that the text of this request is compressed, and is associated with a particular compression ratio (e.g., an uncompressed size divided by a compressed size), and requires a particular amount of memory space to store. Assume that security device 250 receives the first SSL request. removes the random cookie for the first SSL request, and provides the first SSL request to server device 220.

As shown by reference number 630, server device 220 receives the first SSL request and generates a response to the first SSL request. Assume that the response includes the session cookie for the SSL session (e.g., sessionid=ABCDE). Server device 220 provides the response, including the session cookie, to security device 250. As shown by reference number 635, assume that security device 250 generates a second random cookie:

randsessionid=ABCDEABCDEABCAB.

This second random cookie has a different compression ratio than the first random cookie (e.g., based on including different substrings, a different quantity of repeated substrings, etc.). Security device 250 provides, to client device 210, the second random cookie, the session cookie, and the response from server device 220. As shown by reference number 640, client device 210 receives the second random cookie, the session cookie, and the response, and overwrites the first random cookie with the second random cookie (e.g., randsessionid=ABCDEABCDEABCAB).

As shown in FIG. 6C, and by reference number 645, assume that the automated script is again executed on client device 210, and causes client device 210 to send a second SSL request to server device 220. As shown, the second SSL request includes the text:
   Cookie:   randsessionid=ABCDEABCDEABCAB& sessionid=ABCDE.
In this text, client device 210 has prepended the second random cookie to the session cookie, and has separated the second random cookie from the session cookie using an ampersand delimiter. Assume that the text of the second SSL request is compressed (e.g., using a same compression technique as the first SSL request), and is associated with a different compression ratio, and/or requires a different amount of memory space to store, than the text included in the first SSL request. Assume that security device 250 receives the second SSL request and provides the second SSL request to server device 220.

As shown by reference number 650, server device 220 receives the second SSL request and generates a response to the second SSL request. Assume that the response includes the session cookie for the SSL session (e.g., sessionid=ABCDE). Server device 220 provides the response, including the session cookie, to security device 250. As shown by reference number 655, assume that security device 250 generates a third random cookie:
   Randsessionid=rsessionid=ABABAB.
This third random cookie has a different compression ratio than the second random cookie (e.g., and also possibly different than the first random cookie). Security device 250 provides, to client device 210, the third random cookie, the session cookie, and the response from server device 220. As shown by reference number 660, client device 210 receives the third random cookie, the session cookie, and the response, and overwrites the second random cookie with the third random cookie. Security device 250 may continue to generate random cookies in this manner for subsequent requests and/or responses associated with the SSL session. In this way, a hacker may be unable to ascertain the session cookie for the SSL session by examining compression ratios associated with multiple SSL requests.

As indicated above, FIGS. 6A-6C are provided merely as an example. Other examples are possible and may differ from what was described with regard to FIGS. 6A-6C.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Some implementations are described herein as receiving information from a device or providing information to a device. These phrases may refer to receiving information directly from a device or providing information directly to a device, without the information being transferred via an intermediary device situated along a communication path between devices. Additionally, or alternatively, these phrases may refer to receiving information, provided by a device, via one or more intermediary devices (e.g., network devices), or providing information to a device via one or more intermediary devices.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:
1. A device, comprising:
   a memory storing instructions; and
   one or more processors, at least partially implemented in hardware, to execute the instructions to:
      receive, from a first device, a first message that includes a first random cookie and a session cookie;
      provide the first message to a second device;
      receive, from the second device, a second message that includes a response to the first message;
      determine a length of the first random cookie;
      generate a second random cookie based on the length of the first random cookie,
         the second random cookie being of a different length than the length of the first random cookie, and
         the second random cookie being generated using one or more characters included in the session cookie; and
      provide, to the first device, the second random cookie, the session cookie, and the response.
2. The device of claim 1, where the one or more processors are further to:
   receive, from the first device, a request to establish an encrypted connection with the second device;
   provide the request to the second device;
   receive, from the second device and based on providing the request, information that identifies the session cookie;

generate the first random cookie based on receiving the information that identifies the session cookie;
provide, to the first device, the first random cookie and the session cookie; and
where the one or more processors, when receiving the first message from the first device, are to:
receive the first message from the first device based on providing the first random cookie and the session cookie to the first device.

3. The device of claim 1, where the one or more processors, when generating the second random cookie, are to:
determine a compression ratio associated with the first random cookie and the session cookie; and
generate the second random cookie based on determining the compression ratio associated with the first random cookie and the session cookie,
the second random cookie and the session cookie being associated with a different compression ratio than the compression ratio associated with the first random cookie and the session cookie.

4. The device of claim 1, where the one or more processors, when providing the first message to the second device, are to:
remove the first random cookie from the first message to form a modified first message; and
provide the modified first message to the second device without providing the first random cookie.

5. The device of claim 1, where the one or more processors, when generating the second random cookie, are to:
generate the second random cookie after receiving the first message from the first device,
generate the second random cookie after providing the first message to the second device, or
generate the second random cookie after receiving the second message from the second device.

6. A method, comprising:
receiving, by a security device and from a client device, a first request that includes a first random cookie and a session cookie associated with an encrypted communication session;
providing, by the security device, the first request to a server device;
receiving, by the security device and from the server device, information associated with a response to the first request;
determining, by the security device, a length of the first random cookie;
generating, by the security device and based on the length of the first random cookie, a second random cookie associated with the encrypted communication session,
the second random cookie being of a different length than the length of the first random cookie, and
the second random cookie being generated using one or more characters included in the session cookie; and
providing, by the security device and to the client device, the second random cookie, the session cookie, and the information associated with the response to the first request.

7. The method of claim 6, further comprising:
receiving, from the client device, an initial request to establish the encrypted communication session with the server device;
providing the initial request to the server device;
receiving, from the server device and based on providing the initial request, information that identifies the session cookie;
generating the first random cookie based on receiving the information that identifies the session cookie;
providing, to the client device, the first random cookie and the session cookie; and
where receiving the first request from the client device comprises:
receiving the first request from the client device based on providing the first random cookie and the session cookie to the client device.

8. The method of claim 6, where generating the second random cookie comprises:
determining a quantity of characters included in the first random cookie; and
generating the second random cookie based on determining the quantity of characters included in the first random cookie,
the second random cookie including a different quantity of characters than the quantity of characters included in the first random cookie.

9. The method of claim 6, where generating the second random cookie comprises:
determining an amount of memory space required to store the first random cookie and the session cookie after compression using a particular compression technique; and
generating the second random cookie based on determining the amount of memory space,
the second random cookie and the session cookie requiring a different amount of memory space for storage, after compression using the particular compression technique, than the amount of memory space required to store the first random cookie and the session cookie after compression.

10. The method of claim 6, where generating the second random cookie comprises:
determining a character string, included in the session cookie, to be included in the second random cookie;
determining a quantity of times to include the character string in the second random cookie; and
generating the second random cookie based on the character string and the quantity of times to include the character string in the second random cookie,
the second random cookie being generated to include the character string the quantity of times.

11. The method of claim 6, where the encrypted communication session includes at least one of:
a secure socket layer communication session, or
a transport layer security communication session.

12. The method of claim 6, where the first request includes at least one of:
a Hypertext Transfer Protocol (HTTP) request, or
an HTTP Secure (HTTPS) request; and
where the response includes at least one of:
an HTTP response, or
an HTTPS response.

13. A non-transitory computer-readable medium storing instructions, the instructions comprising:
one or more instructions that, when executed by one or more processors, cause the one or more processors to:
receive, from a first device, a first message that includes a first random identifier and a session identifier,
the session identifier identifying an encrypted communication session associated with the first message;
provide the first message to a second device,
the second device being different from the first device;

receive, from the second device, a second message that includes information associated with a response to the first message;
determine a length of the first random identifier,
generate a second random identifier based on the length of the first random identifier,
 the second random identifier being of a different length than the length of the first random identifier, and
 the second random identifier being generated using one or more characters included in the session identifier; and
provide, to the first device, the second random identifier and the information associated with the response, without providing the first random identifier.

14. The non-transitory computer-readable medium of claim 13, where the one or more instructions further cause the one or more processors to:
receive, from the first device, a request associated with the encrypted communication session;
provide the request to the second device;
receive, from the second device and based on providing the request, the session identifier;
generate the first random identifier based on receiving the session identifier;
provide, to the first device, the first random identifier and the session identifier; and
where the one or more instructions, that cause the one or more processors to receive the first message from the first device, cause the one or more processors to:
 receive the first message from the first device based on providing the first random identifier and the session identifier to the first device.

15. The non-transitory computer-readable medium of claim 14, where the one or more instructions further cause the one or more processors to:
determine a quantity of messages received from the first device and associated with the encrypted communication session;
determine that the quantity of messages satisfies a threshold; and
where the one or more instructions, that cause the one or more processors to generate the first random identifier, cause the one or more processors to:
 generate the first random identifier based on determining that the quantity of messages satisfies the threshold.

16. The non-transitory computer-readable medium of claim 13, where the one or more instructions, that cause the one or more processors to generate the second random identifier, cause the one or more processors to:
determine a first length of the first random identifier,
 the first length indicating a first quantity of characters included in the first random identifier;
determine a second length that is different from the first length; and
generate the second random identifier based on determining the second length,
 the second random identifier including a second quantity of characters indicated by the second length.

17. The non-transitory computer-readable medium of claim 13, where the one or more instructions further cause the one or more processors to:
determine an amount of time; and
wait the amount of time prior to at least one of:
 providing the first message to the second device,
 generating the second random identifier, or
 providing the second random identifier and the information associated with the response to the first device.

18. The non-transitory computer-readable medium of claim 13, where the one or more instructions, that cause the one or more processors to generate the second random identifier, cause the one or more processors to:
generate the second random identifier based on determining a substring included in the session identifier,
generate the second random identifier based on determining a quantity of times to include a particular substring, included in the session identifier, in the second random identifier,
generate the second random identifier based on determining an order in which to include multiple substrings, included in the session identifier, in the second random identifier, or
generate the second random identifier based on determining a quantity of substrings, included in the session identifier, to include in the second random identifier.

19. The device of claim 1, where the one or more processors are further to:
determine an amount of memory space required to store the first random cookie and the session cookie after compression using a particular compression technique; and
generate the second random cookie based on determining the amount of memory space,
 the second random cookie and the session cookie requiring a different amount of memory space for storage, after compression using the particular compression technique, than the amount of memory space required to store the first random cookie and the session cookie after compression.

20. The device of claim 1, where, when generating the second random cookie, the one or more processors are to:
determine a quantity of characters included in the first random cookie; and
generate the second random cookie based on determining the quantity of characters included in the first random cookie,
 the second random cookie including a different quantity of characters than the quantity of characters included in the first random cookie.

21. The device of claim 1, where, when generating the second random cookie, the one or more processors are to:
determine a character string, included in the session cookie, to be included in the second random cookie;
determine a quantity of times to include the character string in the second random cookie; and
generate the second random cookie based on the character string and the quantity of times to include the character string in the second random cookie,
 the second random cookie being generated to include the character string the quantity of times.

* * * * *